US012718471B2

(12) United States Patent
Wang et al.

(10) Patent No.: US 12,718,471 B2
(45) Date of Patent: Aug. 25, 2026

(54) UNDER-DISPLAY ARRAY CAMERA PROCESSING FOR THREE-DIMENSIONAL (3D) SCENES

(71) Applicant: Samsung Electronics Co., Ltd., Suwon-si (KR)

(72) Inventors: Chengyu Wang, Plano, TX (US); Jing Li, Allen, TX (US); Jinhan Hu, Little Elm, TX (US); Pavan Madhusudanarao, Plano, TX (US); Hamid R. Sheikh, Allen, TX (US); John Seokjun Lee, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 18/918,500

(22) Filed: Oct. 17, 2024

(65) Prior Publication Data

US 2025/0225719 A1 Jul. 10, 2025

Related U.S. Application Data

(60) Provisional application No. 63/617,912, filed on Jan. 5, 2024.

(51) Int. Cl.
*G06T 15/50* (2011.01)
*G06T 7/174* (2017.01)
(Continued)

(52) U.S. Cl.
CPC ............ *G06T 15/503* (2013.01); *G06T 7/174* (2017.01); *G06T 7/337* (2017.01); *G06V 10/24* (2022.01);
(Continued)

(58) Field of Classification Search
CPC ....... G06T 15/503; G06T 7/174; G06T 7/337; G06T 2207/20016; G06T 2207/20221; G06T 5/50; G06V 10/24
See application file for complete search history.

(56) References Cited

U.S. PATENT DOCUMENTS 9,432,576 B2 8/2016 Pekkucuksen et al.
9,519,972 B2 12/2016 Venkataraman et al.
(Continued)

FOREIGN PATENT DOCUMENTS

CN 209151258 U * 7/2019
CN 112422870 B 9/2021

OTHER PUBLICATIONS

Open Source Computer Vision, "Feature Matching with FLANN," https://docs.opencv.org/3.4/d5/d6f/tutorial_feature_flann_matcher.html, Sep. 2020, 3 pages.
Rublee et al., "ORB: An efficient alternative to SIFT or SURF," 2011 International Conference on Computer Vision, Nov. 2011, 9 pages.
(Continued)

*Primary Examiner* — Haixia Du

(57) ABSTRACT

A first image frame and a second image frame are captured using first and second under-display cameras positioned under an LED display. The second image frame is globally aligned to the first image frame to generate a globally-aligned second image frame. An optical flow map based on the first image frame and the globally-aligned second image frame is generated, and an occlusion map based on the first image frame and the globally-aligned second image frame is generated. The globally-aligned second image frame is warped based on the optical flow map and the occlusion map to generate a warped image frame. The first image frame and the warped image frame are blended to generate an output image.

20 Claims, 13 Drawing Sheets

(51) Int. Cl.
*G06T 7/33* (2017.01)
*G06V 10/24* (2022.01)

(52) U.S. Cl.
CPC ............... *G06T 2207/20016* (2013.01); *G06T 2207/20221* (2013.01)

(56) References Cited

U.S. PATENT DOCUMENTS

| | | | | |
|---|---|---|---|---|
| 11,257,272 | B2 | 2/2022 | Rowell et al. | |
| 11,875,490 | B2 | 1/2024 | Lee et al. | |
| 2022/0207658 | A1* | 6/2022 | Tong | G06T 5/70 |
| 2024/0112356 | A1 | 4/2024 | Sekkappan et al. | |
| 2024/0177466 | A1 | 5/2024 | Song et al. | |
| 2025/0139733 | A1* | 5/2025 | Jeong | G06T 3/18 |

OTHER PUBLICATIONS

Teed et al., "Raft: Recurrent all-pairs field transforms for optical flow," ECCV 2020: 16th European Conference, Proceedings, Part II, Aug. 2020, 21 pages.

Hur et al., "Iterative residual refinement for joint optical flow and occlusion estimation," Proceedings of the IEEE/CVF Conference on Computer Vision and Pattern Recognition, 2019, 10 pages.

Open Source Computer Vision, "Remapping," https://docs.opencv.org/3.4/d1/da0/tutorial_remap.html, Jul. 2022, 5 pages.

Farbman et al., "Convolution pyramids," ACM Transactions on Graphics, Dec. 2011, 8 pages.

Burt et al., "A multiresolution spline with application to image mosaics," ACM Transactions on Graphics, Oct. 1983, 20 pages.

Zhou et al., "Image restoration for under-display camera," Proceedings of the IEEE/CVF Conference on Computer Vision and Pattern Recognition, 2021, 10 pages.

* cited by examiner

802

$Im^2$ $Im^1$

UNDER-DISPLAY ARRAY CAMERA PROCESSING FOR THREE-DIMENSIONAL (3D) SCENES

CROSS-REFERENCE TO RELATED APPLICATION AND PRIORITY CLAIM

This application claims priority under 35 U.S.C. § 119(e) to U.S. Provisional Patent Application No. 63/617,912 filed on Jan. 5, 2024, which is hereby incorporated by reference in its entirety.

TECHNICAL FIELD

This disclosure relates generally to image processing devices and processes. More specifically, this disclosure relates to under-display array camera processing for three-dimensional (3D) scenes.

BACKGROUND

Under-display camera (UDC) technology has been a key enabler for producing full-screen mobile devices. In a UDC device, at least one digital camera can be positioned underneath a semi-transparent display panel. Unfortunately, a limited amount of light can be transmitted through a pattern of the display panel. This can cause images taken by an under-display camera to be susceptible to artifacts, including noise and light diffraction, causing unpleasant image quality (IQ).

SUMMARY

This disclosure relates to under-display array camera processing for three-dimensional (3D) scenes.

In a first embodiment, an apparatus includes a light emitting diode (LED) display, first and second under-display cameras, and at least one processor. The first and second under-display cameras are positioned under the LED display. The first under-display camera is configured to capture a first image frame, and the second under-display camera is configured to capture a second image frame. The at least one processor is also configured to globally align the second image frame to the first image frame to generate a globally-aligned second image frame. The at least one processor is further configured to generate an optical flow map based on the first image frame and the globally-aligned second image frame. The at least one processor is also configured to generate an occlusion map based on the first image frame and the globally-aligned second image frame. The at least one processor is further configured to warp the globally-aligned second image frame based on the optical flow map and the occlusion map to generate a warped image frame. In addition, the at least one processor is configured to blend the first image frame and the warped image frame to generate an output image.

In a second embodiment, a method includes capturing, using first and second under-display cameras positioned under an LED display, a first image frame and a second image frame. The method further includes globally aligning the second image frame to the first image frame to generate a globally-aligned second image frame. The method also includes generating an optical flow map based on the first image frame and the globally-aligned second image frame. The method further includes generating an occlusion map based on the first image frame and the globally-aligned second image frame. The method also includes warping the globally-aligned second image frame based on the optical flow map and the occlusion map to generate a warped image frame. In addition, the method includes blending the first image frame and the warped image frame to generate an output image.

In a third embodiment, a non-transitory machine readable medium contains instructions that when executed cause at least one processor to capture, using first and second under-display cameras positioned under an LED display, a first image frame and a second image frame. The non-transitory machine readable medium further contains instructions that when executed cause the at least one processor to globally align the second image frame to the first image frame to generate a globally-aligned second image frame. The non-transitory machine readable medium also contains instructions that when executed cause the at least one processor to generate an optical flow map based on the first image frame and the globally-aligned second image frame. The non-transitory machine readable medium further contains instructions that when executed cause the at least one processor to generate an occlusion map based on the first image frame and the globally-aligned second image frame. The non-transitory machine readable medium also contains instructions that when executed cause the at least one processor to warp the globally-aligned second image frame based on the optical flow map and the occlusion map to generate a warped image frame. In addition, the non-transitory machine readable medium contains instructions that when executed cause the at least one processor to blend the first image frame and the warped image frame to generate an output image.

Any one or any combination of the following features may be used with the first, second, or third embodiment. Global homography may be performed on the second image frame and the first image frame to globally align the second image frame to the first image frame. Pyramid blending on the first image frame and the warped image frame may be performed to blend the first image frame and the warped image frame. The occlusion map may be a non-binary occlusion map. The first image frame and the warped image frame may be blended using an average operator. The first image frame and the warped image frame may be blended using a weighted average operator. The first image frame and the warped image frame may be blended using a minimum operator.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "function," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings.

DETAILED DESCRIPTION

FIGS. 1 through 16, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, under-display camera (UDC) technology has been a key enabler for producing full-screen mobile devices. In a UDC device, at least one digital camera can be positioned underneath a semi-transparent display panel. Unfortunately, a limited amount of light can be transmitted through a pattern of the display panel. This can cause images taken by an under-display camera to be susceptible to artifacts, including noise and light diffraction, causing unpleasant image quality (IQ).

This disclosure describes various techniques for under-display array camera processing for three-dimensional (3D) scenes. In some under-display array camera (UDAC) devices, for example, each camera may be disposed under a unique pattern of an OLED panel. Thus, combining measurements from the cameras can reduce or eliminate diffraction artifacts caused by the limited amount of light transmitted through the OLED panel. To provide increased merging performance, images captured by each camera can be aligned to achieve improved pixel-level correspondence. Previous techniques for aligning images are often deficient in addressing occlusion issues in 3D scenes. This disclosure also describes techniques for aligning 3D images and matching accurate color and brightness in UDAC devices.

Figure 1:
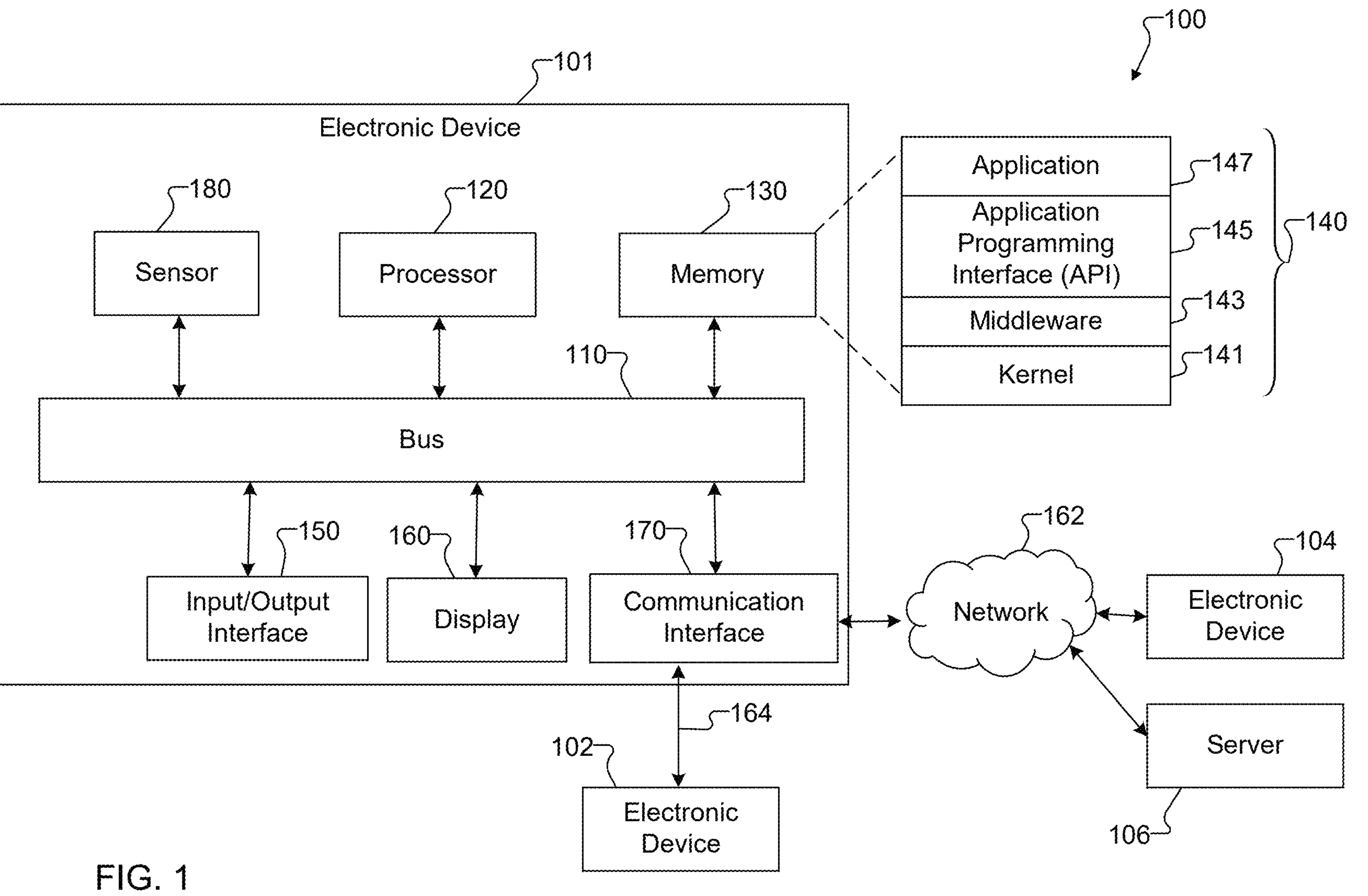
FIG. 1 illustrates an example network configuration including an electronic device in accordance with this disclosure.

FIG. 1 illustrates an example network configuration 100 including an electronic device 101 in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-1680 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may obtain and process multiple UDAC input images as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process multiple UDAC input images. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first external electronic device 102, a second external electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the one or more sensors 180 include one or more cameras or other imaging sensors, which may be used to capture images of scenes, including under-display cameras. The under-display cameras can be positioned under an LED panel. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the first external electronic device 102 (such as the HMD), the electronic device 101 can communicate with the first external electronic device 102 through the communication interface 170. The electronic device 101 can be directly connected with the first external electronic device 102 to communicate with the first external electronic device 102 without involving with a separate network. The electronic device 101 can also be an augmented reality wearable device, such as eyeglasses, that includes one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the first and second external electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as first and second external electronic devices 102 and 104 or server 106) to perform at least some functions associated therewith. The other electronic device (such as first and second external electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the second external electronic device 104 or server 106 via the network 162 or 164, the electronic device 101 may be independently operated without a separate communication function according to some embodiments of this disclosure.

The server 106 can include the same or similar components 110-1680 as the electronic device 101 (or a suitable subset thereof). The server 106 can support to drive the electronic device 101 by performing at least one of operations (or functions) implemented on the electronic device 101. For example, the server 106 can include a processing function or processor that may support the processor 120 implemented in the electronic device 101. As described below, the server 106 may obtain and process multiple UDAC input images as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
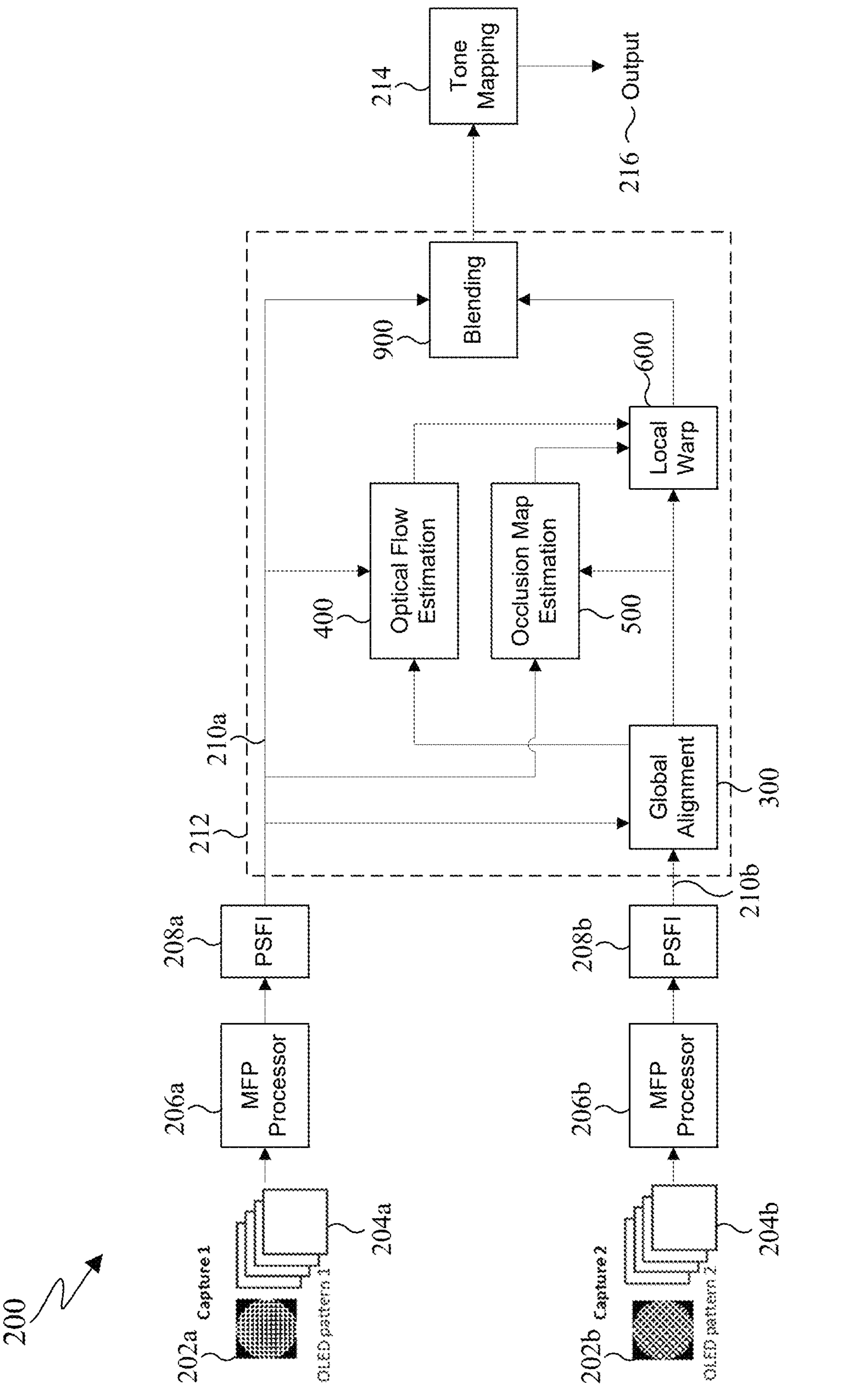
FIG. 2 illustrates an example processing pipeline for an under-display array camera (UDAC) system in accordance with this disclosure.

FIGS. 2 through 10 illustrate an example processing pipeline 200 for a UDAC system and related details in accordance with this disclosure. For ease of explanation, the processing pipeline 200 shown in FIG. 2 is described as being implemented on or supported by the electronic device 101 in the network configuration 100 of FIG. 1. However, the processing pipeline 200 shown in FIG. 2 could be used with any other suitable device(s) and in any other suitable system(s), such as when the processing pipeline 200 is implemented on or supported by the server 106.

As shown in FIG. 2, the processing pipeline 200 generally operates with light passing through first and second OLED patterns 202*a* and 202*b*. The OLED patterns 202*a* and 202*b* are patterns of an OLED panel (which may represent a display 160 of the electronic device 101) in front of under-display cameras (which may represent imaging sensors 180 of the electronic device 101). The OLED patterns 202*a* and 202*b* can be unique or different to allow light to be transmitted differently to the under-display cameras.

The under-display cameras can create one or more first input frames 204*a* and one or more second input frames 204*b*. In some embodiments, the input frames 204*a* and 204*b* represent raw image frames. Raw image frames typically refer to image frames that have undergone little if any processing after being captured. The availability of raw image frames can be useful in a number of circumstances since the raw image frames can be subsequently processed to achieve the creation of desired effects in output images. In many cases, for example, the input frames 204*a* and 204*b* can capture different portions of a scene not obstructed by the respective OLED patterns 202*a* and 202*b*. The input frames 204*a* and 204*b* here may include any suitable number of input frames 204*a* and 204*b*, such as two or more input frames 204*a* and 204*b*. Each input frame 204*a* and 204*b* can have any suitable format, such as a Bayer or other raw image format, a red-green-blue (RGB) image format, or a luma-chroma (YUV) image format. Each input frame 204*a* and 204*b* can also have any suitable resolution, such as up to fifty megapixels or more.

The processing pipeline 200 can process the input frames 204*a* and 204*b* using multi-frame processing (MFP) functions 206*a* and 206*b*. The MFP functions 206*a* and 206*b* can generally operate to combine their respective input frames 204*a* and 204*b* into single frames. For example, the MFP function 206*a* may combine multiple input frames 204*a* into a single frame, and the MFP function 206*b* may combine multiple input frames 204*b* into a single frame. In some embodiments, the MFP functions 206*a* and 206*b* can be performed in parallel. The MFP functions 206*a* and 206*b* may use any suitable technique to combine image frames. Various multi-frame processing techniques are known in the art, and other multi-frame processing techniques are sure to be developed in the future. This disclosure is not limited to any specific multi-frame processing technique.

Point spread function inversion (PSFI) functions 208*a* and 208*b* can perform deblurring of the single frames output from the MFP functions 206*a* and 206*b*. For instance, the PSFI functions 208*a* and 208*b* can at least partially correct for blurring caused by light passing through the OLED panel positioned over the under-display cameras. In some cases, the OLED panel can be thought of as functioning as a binary aperture that produces a point spread function containing multiple spikes. Because of wires and diodes of the OLED panel, the binary aperture can contain multiple straight edges, which produce spikes in the PSFI that are perpendicular to the straight edges. In a mobile device, the OLED panel can also rotate with respect to a scene, which causes the spikes to also rotate. When combining light measurements, spikes can be decreased if the spikes are only shown in part of the measurements.

Figures 3, 4:
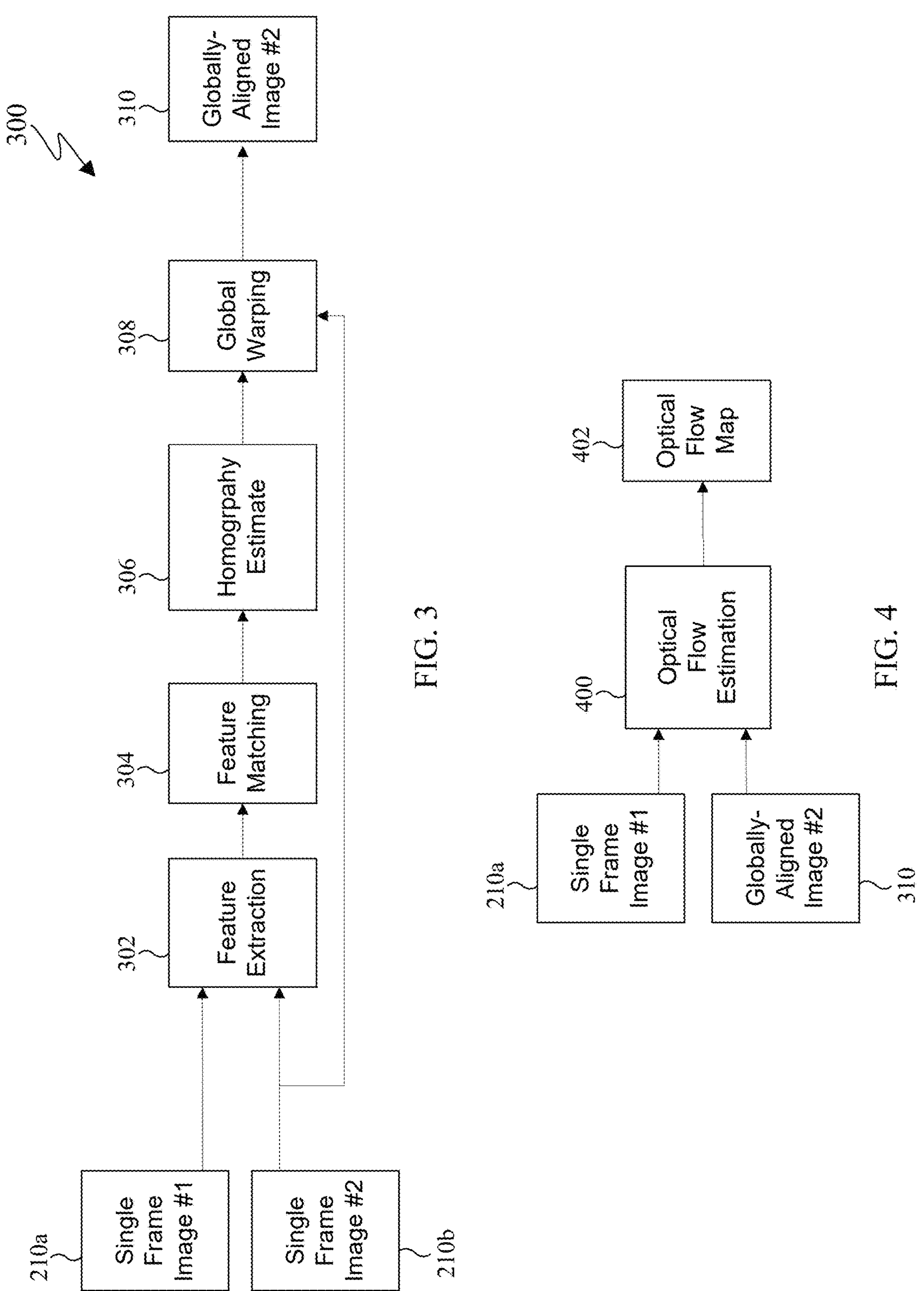
FIG. 3 illustrates an example global alignment function for the processing pipeline in accordance with this disclosure.
FIG. 4 illustrates an example optical flow estimation function for the processing pipeline in accordance with this disclosure.

Deblurred image frames 210*a* and 210*b* can be output from the PSFI functions 208*a* and 208*b* to an alignment and blending function 212. The alignment and blending function 212 can utilize optical flow, occlusion detection, and pyramid blending to capture 3D scenes where occlusions exist when the input frames 204*a* and 204*b* are captured from different viewpoints. As shown in FIGS. 2 and 3, the alignment and blending function 212 can include a global alignment function 300 that roughly aligns first and second deblurred image frames 210*a* and 210*b*. In this example, the global alignment function 300 includes a feature extraction function 302, a feature matching function 304, a homography estimate function 306, and a global warping function 308. The feature extraction function 302 can extract features from the deblurred image frames 210*a* and 210*b*, such as to identify object points or other features in the deblurred image frames 210*a* and 210*b*. The feature matching function 304 can perform feature-matching on the extracted features in order to identify common features captured in both deblurred image frames 210*a* and 210*b*. The homography estimate function 306 can estimate a perspective transformation matrix based on the matched feature points, such as by generating a transformation matrix that can be used to warp one deblurred image frame 210*a* or 210*b* so that its features generally align with the features of the other deblurred image frame 210*b* or 210*a*. The global warping function 308 can perform the warping based on the transformation matrix to generally align the features, which leads to the generation of a globally-aligned second frame 310.

Each function of the global alignment function 300 can implement any suitable technique(s) to perform the described function(s). For example, the feature extraction function 302 may use an Oriented FAST and rotated BRIEF (ORB) technique to detect and describe distinctive features in the deblurred image frames 210*a* and 210*b* with high efficiency and accuracy. The feature matching function 304 may obtain three-dimensional (3D) coordinates of each of the extracted features, such as in a camera coordinate system of a current frame, according to depth information of depth image frames. For each extracted feature in one frame, the feature matching function 304 can attempt to find a matching feature in another frame according to local information of the features. The feature matching function 304 can thereby obtain 3D coordinates of the matching features in the other frame in the camera coordinate system. In some cases, feature-related information obtained by the feature extraction function 302 and the feature matching function 304 may be stored in the storage device, such as the memory 130 of the electronic device 101, as related information with respect to the current frame to be used in subsequent processing. The homography estimate function 306 may estimate a perspective transformation matrix using the matched features, such as by using a random sample consensus (RANSAC) algorithm to improve the robustness of the transformation matrix. The global warping function 308 can perform bicubic interpolation or other warping to interpolate each pixel value in one image frame based on the surrounding pixels, such as in a 4×4 grid. Using bicubic interpolation may lead to a warped image frame that is highly accurate and that exhibits fewer artifacts. The globally-aligned second image frame 310 is output from the global warping function 308.

As shown in FIGS. 2 and 4, the first deblurred image frame 210*a* and the globally-aligned second image frame 310 are input into an optical flow estimation function 400. The optical flow estimation function 400 generally operates to produce an optical flow map 402 using the first deblurred image frame 210*a* and the globally-aligned second image frame 310. Optical flow is a pattern of apparent motion of objects, surfaces, edges, and/or other contents in a visual scene caused by a relative motion between an observer and the scene. Optical flow can sometimes be defined as a distribution of apparent velocities of movement of brightness pattern in image frames. The optical flow estimation function 400 can use any suitable technique to generate optical flow maps. In some cases, the optical flow estimation function 400 can implement a neural network, such as one using recurrent all-pairs field transforms, to identify optical flow. Each optical flow map 402 contains motion information of at least one object or other contents in a scene that are captured by the image frames input to the optical flow estimation function 400.

Figure 5:
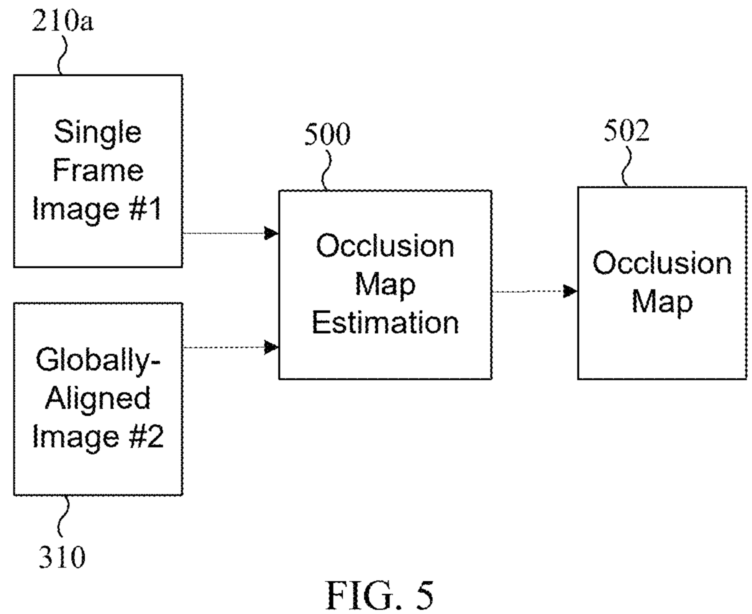
FIG. 5 illustrates an example occlusion map estimation function for the processing pipeline in accordance with this disclosure.

As shown in FIGS. 2 and 5, the first deblurred image frame 210*a* and the globally-aligned second image frame 310 are also input into an occlusion map estimation function 500. The occlusion map estimation function 500 generally operates to produce an occlusion map 502 using the first deblurred image frame 210*a* and the globally-aligned second image frame 310. The occlusion map 502 identifies if each pixel in the globally-aligned second image frame 310 is occluded. The occlusion map 502 is typically a binary image with some areas (such as pixels with a value of one) indicating areas in the globally-aligned second image frame 310 that are not occluded and other areas (such as pixels with a value of zero) indicating areas in the globally-aligned second image frame 310 that are occluded.

In some embodiments, the binary restriction on the occlusion map 502 can be relaxed (meaning non-binary values other than zero and one may be used) to allow soft boundaries in the occlusion map 502. By allowing soft boundaries, the values associated with occlusions are allowed to deviate from zero and one to an extent, and the occlusions values can be in an inclusive range between zero and one. In some cases, the occlusion values can be capped to specified ranges, such as from zero to 0.25 and from 0.75 to one. The soft occlusion map 502 can be obtained in any suitable manner, such as by blurring a binary map or obtaining the soft occlusion map 502 from an external source. In particular embodiments, blurring the binary map can be achieved by applying a low-pass filter, a Gaussian kernel, or any other filter that can blur hard boundaries. If obtained from an external source, a sigmoid operator followed by a thresholding operator may be utilized to obtain a binary map. The thresholding operator may also be omitted to allow the output to be continuous between zero and one.

Figure 6:
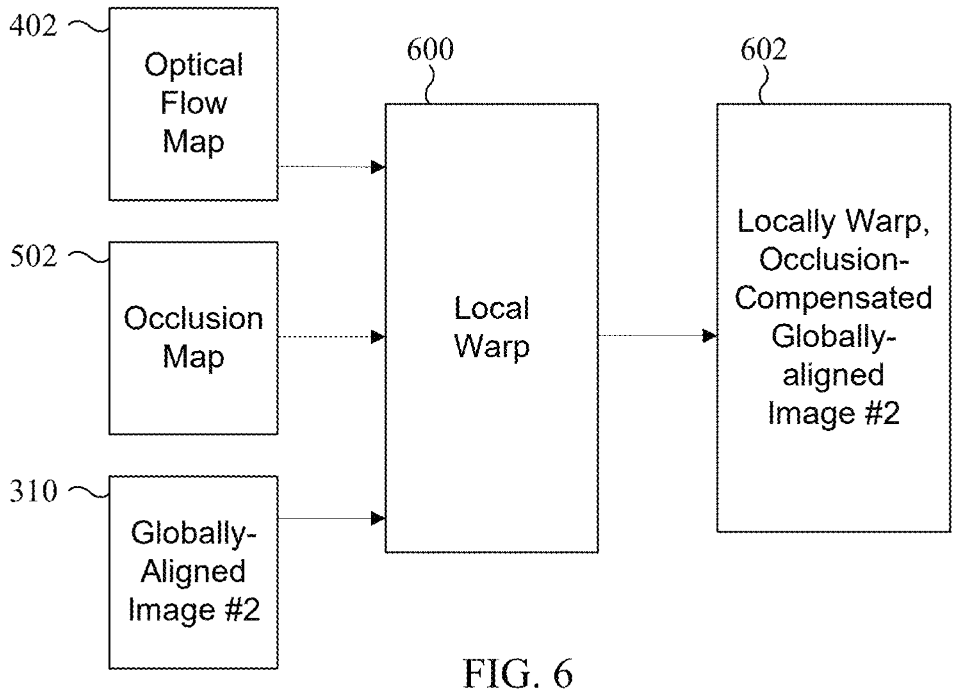
FIG. 6 illustrates an example local warp function for the processing pipeline in accordance with this disclosure.

As shown in FIGS. 2 and 6, a local warp function 600 generally operates to produce a locally warped, occlusion-compensated, globally-aligned second image frame 602 using the globally-aligned second image frame 310, the optical flow map 402, and the occlusion map 502. For example, the optical flow map 402 and the occlusion map 502 may be used to warp the globally-aligned second image frame 310 in order to at least partially compensate for the optical flow and occlusions. In some cases, the warping may be performed in the following manner.

$$I_2^{warp} = \text{Warp}\ (I_2, \text{Flow}) * Occ + I_1 * (I - Occ) \tag{1}$$

Here, $$I_2^{warp}$$

represents a result of the local warp operation that produces a locally-warped, occlusion-compensated, globally-aligned second image frame 602, $I_2$ represents a globally-aligned second image frame 310, and $I_1$ represents a first image frame 204*a*. Also, Warp represent a warping operation that takes the globally-aligned second image frame 310 and optical flow map 402 as inputs, Occ represents an occlusion map 502, and I represents an identity matrix. In some embodiments, the warping with optical flow can be achieved with an OpenCV remap function. Using Equation (1), each pixel that is occluded in the globally-aligned second image frame 310 may be replaced by a corresponding pixel from the first input frame 204*a*.

In some embodiments, a color match technique can be used in the local warp function 600 to match brightness and tone between the first and second deblurred image frames 210*a* and 210*b*. For example, the first and second deblurred image frames 210*a* and 210*b* may have different ISO/exposure levels, color temperatures, and/or sensor responses, which may result in tone and brightness differences. In a UDAC system, each image frame capture can also be affected by the unique pattern in the OLED panel above its corresponding under-display camera. For instance, the unique pattern can change an optical response of the under-display camera and increase the difference between measurements of image data between different under-display cameras.

In some embodiments, tone and brightness matching between two image frames may be achieved using linear matching. For two image frames $Im^1$ and $Im^2$, an example goal of linear matching may be to find two parameters ($\alpha$ and $\beta$) so that $Im^1 \times \alpha + \beta$ has substantially the same color and brightness as $Im^2$. In some cases, the linear matching can find a linear operation that applies to all pixels in an image, where $\alpha$ and $\beta$ represent how much brightness change each pixel needs. As a particular example, the $\alpha$ and $\beta$ parameters may be calculated in the following manner.

$$\alpha, \beta = \text{argmin}_{\alpha,\beta} \sum_i^I \left(Im_i^1 \times \alpha + \beta - Im_i^2\right)^2 \quad (2)$$

Here, $\alpha$ and $\beta$ represent the linear matching parameters, $Im^1$ represents an $i^{th}$ pixel in an image frame, and I represents a total number of pixels.

Different regions of image frames can have different brightness changes, which can reduce the effectiveness of linear matching for tone and brightness matching. In some embodiments, color matching can be performed using a mapping that considers both local linear matching and global consistency to be estimated. Instead of having two parameters $\alpha$ and $\beta$ for all of the pixels in image frames, the parameters can be estimated for each individual pixel $Im_i$. The collection of the parameters $\alpha$ and $\beta$ can be implemented in a linear match map A or B that has the same dimensions as the image frames. As a particular example, the color matching may be achieved in the following manner.

$$Im^1_{match} = Im^1 \cdot A + B \quad (3)$$

$$A, B \in R^{M \times N} \quad (4)$$

Figures 7A, 7B:
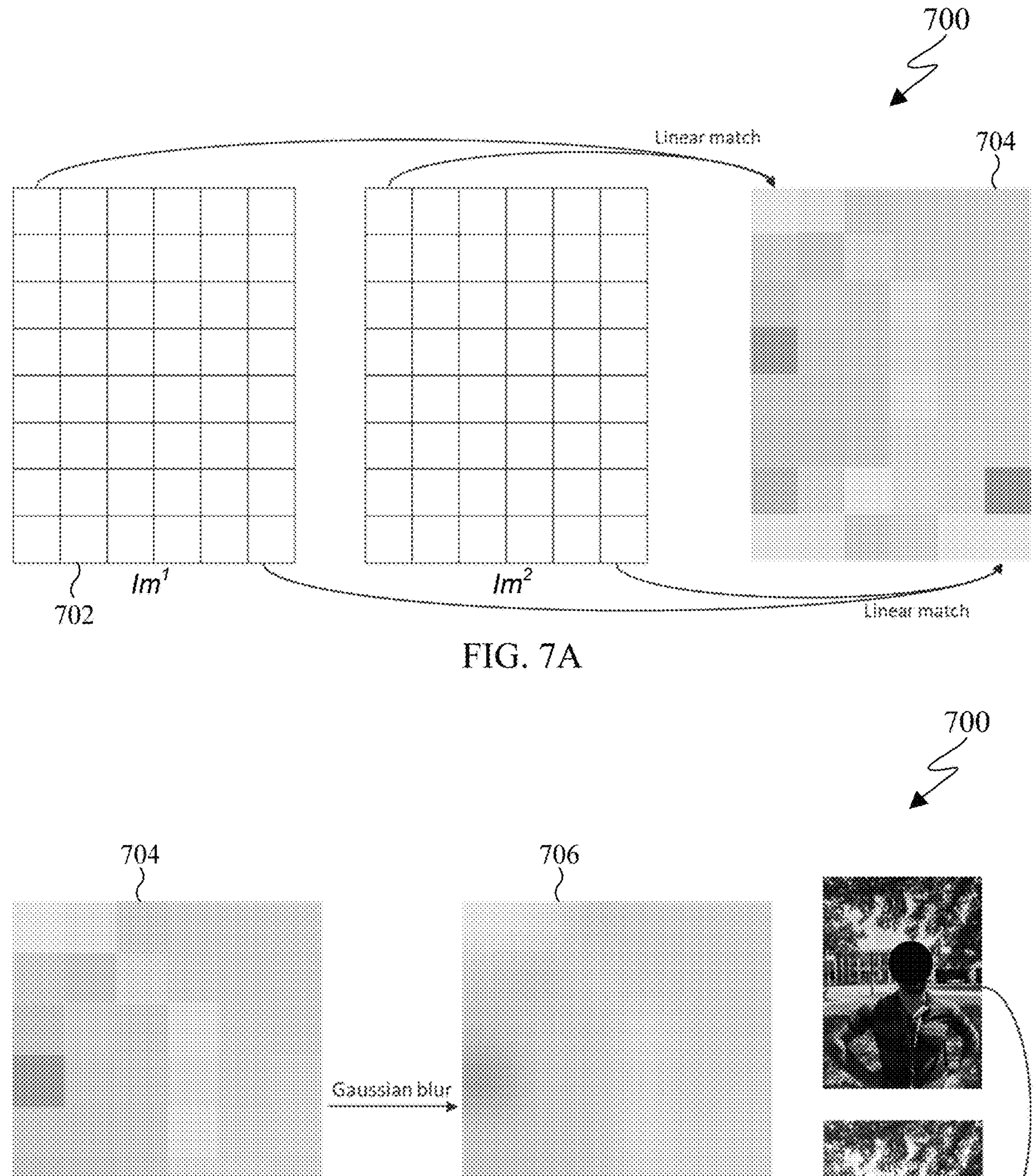
FIGS. 7A and 7B illustrate an example tile-based technique for brightness and tone matching to remove blending artifacts in the local warp function in accordance with this disclosure.

In some cases, a tile-based technique for brightness and tone matching may be used to remove blending artifacts in the local warp function 600 or prior to a blending function 900. FIGS. 7A and 7B illustrate an example tile-based technique 700 for brightness and tone matching to remove blending artifacts in the local warp function in accordance with this disclosure. As shown in FIG. 7A, the two image frames $Im^1$ and $Im^2$ can be divided into tiles 702. For each tile pair between the two image frames $Im^1$ and $Im^2$ (meaning one tile of the image $Im^1$ and one tile of the image frame $Im^2$), a linear match map 704 is determined to represent all of the local linear matches. As shown in FIG. 7B, a blur, such as a Gaussian blur, can be applied to the linear match map 704 to smooth out boundaries in order to maintain global consistency and avoid boundary artifacts. A resulting blurred linear match map 706 can be used to adjust brightness and tone of each pixel before blending. A size of the kernel used may be a function of tile size. For example, the kernel size may be in a range from the tile size to double the tile size.

Figure 8:
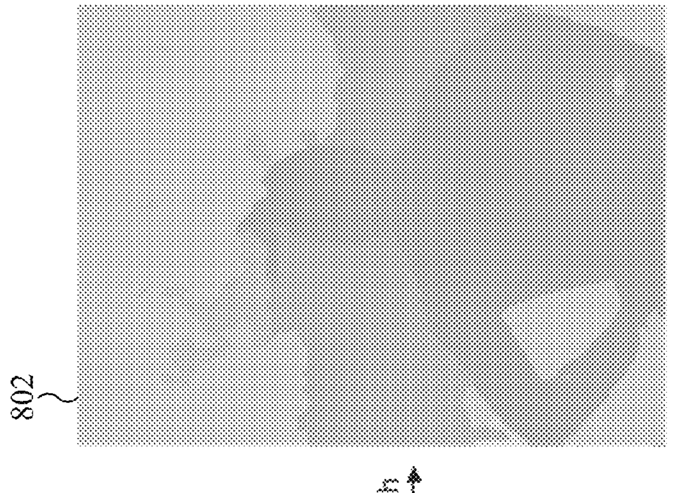
FIG. 8 illustrates an example segmentation-based technique for brightness and tone matching to remove blending artifacts in the local warp function in accordance with this disclosure.
Figure 8:
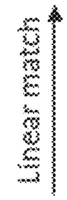
Figure 8:
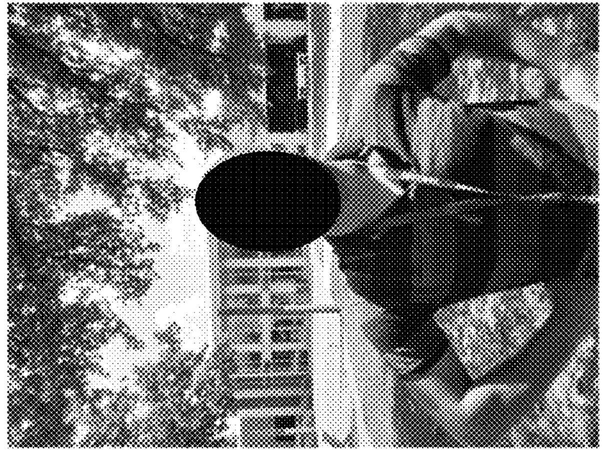
Figure 8:
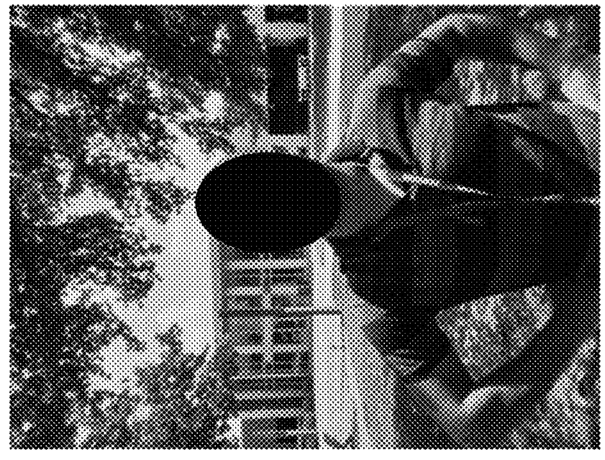
Figure 8:
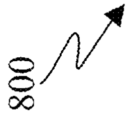
Figure 8:

In other cases, a segmentation-based technique for brightness and tone matching may be used to remove blending artifacts in the local warp function 600 or prior to the blending function 900. FIG. 8 illustrates an example segmentation-based technique 800 for brightness and tone matching to remove blending artifacts in the local warp function in accordance with this disclosure. As shown in FIG. 8, the segmentation-based technique 800 can generate a linear map 802 based on determining different regions of two image frames $Im^1$ and $Im^2$. For example, the different regions can be based on depths of the pixels in the two image frames.

Figure 9:
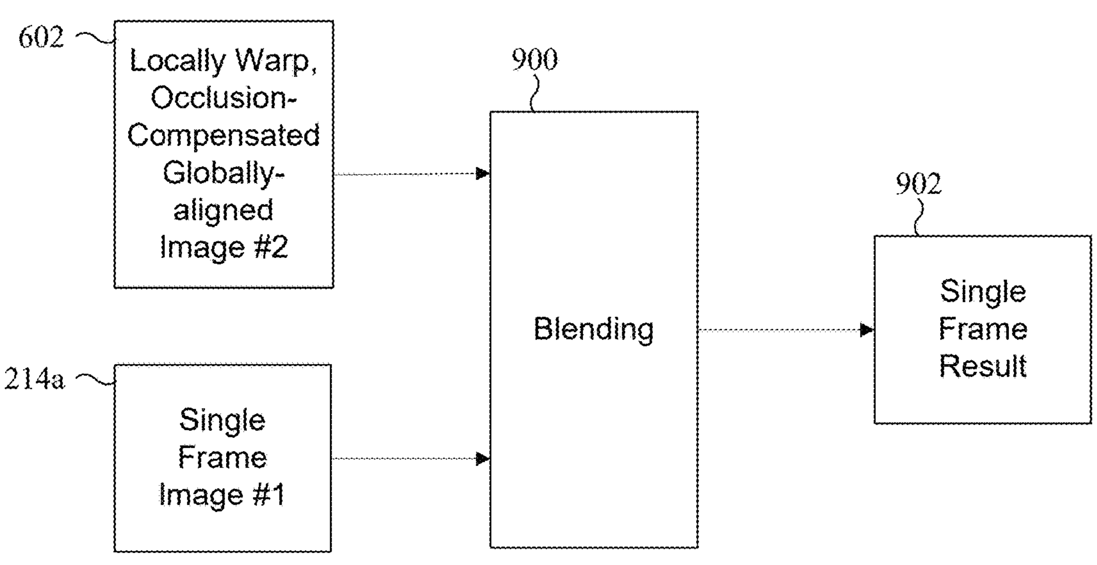
FIG. 9 illustrates an example blending function for the processing pipeline in accordance with this disclosure.

As shown in FIGS. 2 and 9, the locally-warped, occlusion-compensated, globally-aligned second image frame 602 and the first deblurred image frame 210*a* can be input into the blending function 900, which generally operates to blend these image frames and generate a blended image frame 902. The blending function 900 may use any suitable technique to blend image frames. For example, in some embodiments, the first deblurred image frame 210*a* and the globally-aligned second image frame 602 can be blended using pyramid blending. Examples of pyramid blending that can be utilized may include convolution pyramids, multi-resolution splines with application to image mosaics, or any other suitable pyramid blending. Other blending operations that can be employed to combine the image frames to yield a blended image frame 902 may include using an average operator, a minimum operator, or a weighted average operator. When an average operator is used, for instance, pixel values in the locally-warped, occlusion-compensated, globally-aligned second image frame 602 are averaged with corresponding pixel values in the first input frame 204*a* to obtain the blended image frame 902. When a weighted average operator is used, pixel values in the locally-warped, occlusion-compensated, globally-aligned second image frame 602 are averaged with corresponding pixel values in the first input frame 204*a* to obtain the blended image frame 902, but different weights may be applied to the different image frames or portions thereof. When the minimum operator is used, the minimum values at each location in the image frames can be selected to obtain the blended image frame 902.

Figure 10:
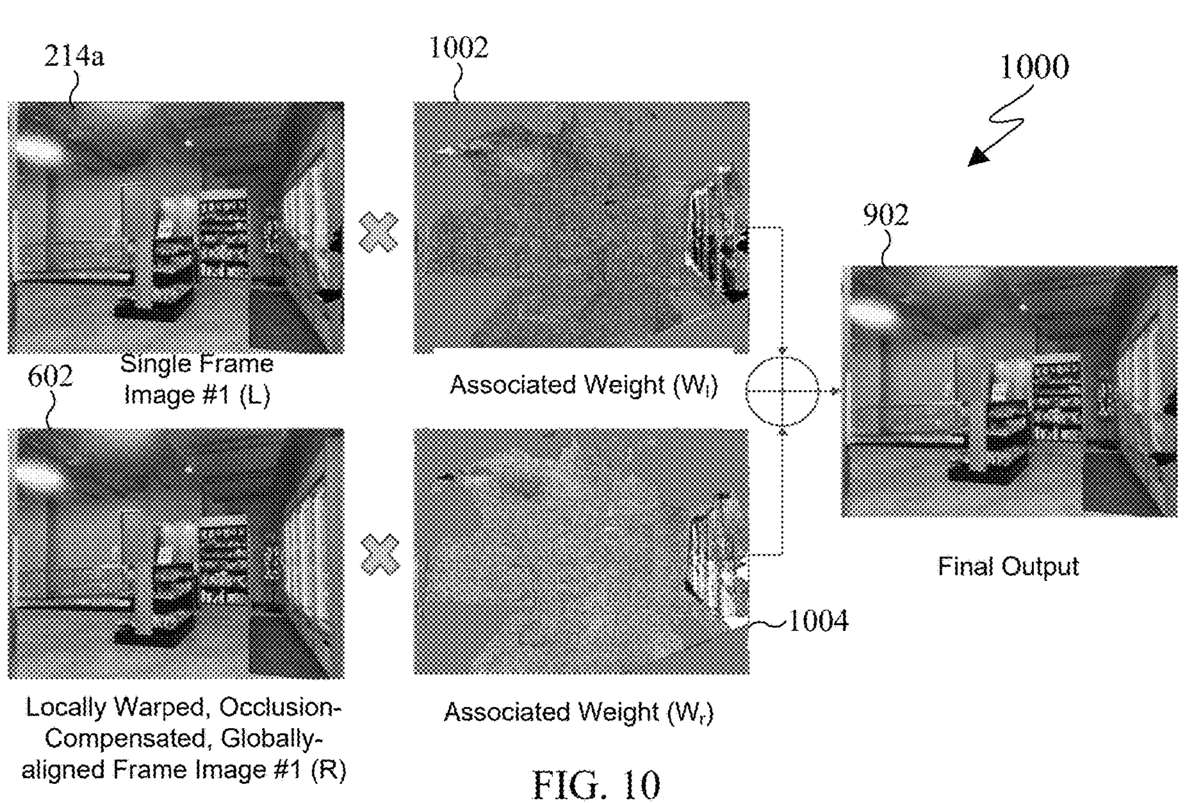
FIG. 10 illustrates an example weighted average operator function that may be used in the blending function in accordance with this disclosure.

FIG. 10 illustrates an example weighted average operator function 1000 that may be used in the blending function 900 in accordance with this disclosure. As shown in FIG. 10, the locally-warped, occlusion-compensated, globally-aligned second image frame 602 and the first input frame 204*a* can be pre-multiplied by weights 1002 and 1004. The weights 1002 and 1004 can reflect an amount of information from each of the input frames 204*a* and 204*b*. For example, a higher value for a pixel can be given for a weight 1002, 1004 corresponding to the deblurred image frame 210*a* or 210*b* with less distortion. In some cases, a local contrast can be calculated with a Laplacian filter to determine levels of distortion from each of the input frames 204*a* and 204*b*. On a per-pixel basis, the final blended image frame 902 may be determined as follows.

$$\text{Output} = L * W_l + R \times W_r$$

Here, Output corresponds to the blended image frame 902, L represents a first input frame 204*a*, and R represents a locally-warped, occlusion-compensated, globally-aligned second image frame 602. Also, $W_l$ represent an associated weight 1002 corresponding to the first input frame 204*a*, and $W_r$ represents an associated weight 1004 corresponding to the locally-warped, occlusion-compensated, globally-aligned second image frame 602.

As shown in FIG. 2, a tone mapping function 214 can be performed on the blended image frame 902 to generate an output image 216. For example, the tone mapping function 214 can apply a global tone mapping curve on the blending output to brighten-up dark areas and increase image contrast. Tone mapping may be performed in any suitable manner, such as by using one or more lookup tables to identify how image data in the blended image frame 902 is replaced. Any other or additional post-processing of the blended image frame 902 may be performed to generate the output image 216.

Although FIGS. 2 through 10 illustrate one example of a processing pipeline 200 for a UDAC system and related details, various changes may be made to FIGS. 2 through 10. For example, various components or functions in these figures may be combined, further subdivided, replicated, rearranged, or omitted according to particular needs. Also, various additional components or functions may be used in these figures. In addition, the numbers of various components (including occlusion maps, flow maps, and input frames) can vary as needed or desired.

FIGS. 11 through 15 illustrate other example processing pipelines 1100-1500 for a UDAC system in accordance with this disclosure. For ease of explanation, each of the processing pipelines 1100-1500 shown in FIGS. 11 through 15 is described as being implemented on or supported by the electronic device 101 in the network configuration 100 of FIG. 1. However, each of the processing pipelines 1100-1500 shown in FIGS. 11 through 15 could be used with any other suitable device(s) and in any other suitable system(s), such as when the processing pipeline is implemented on or supported by the server 106.

Figure 11:
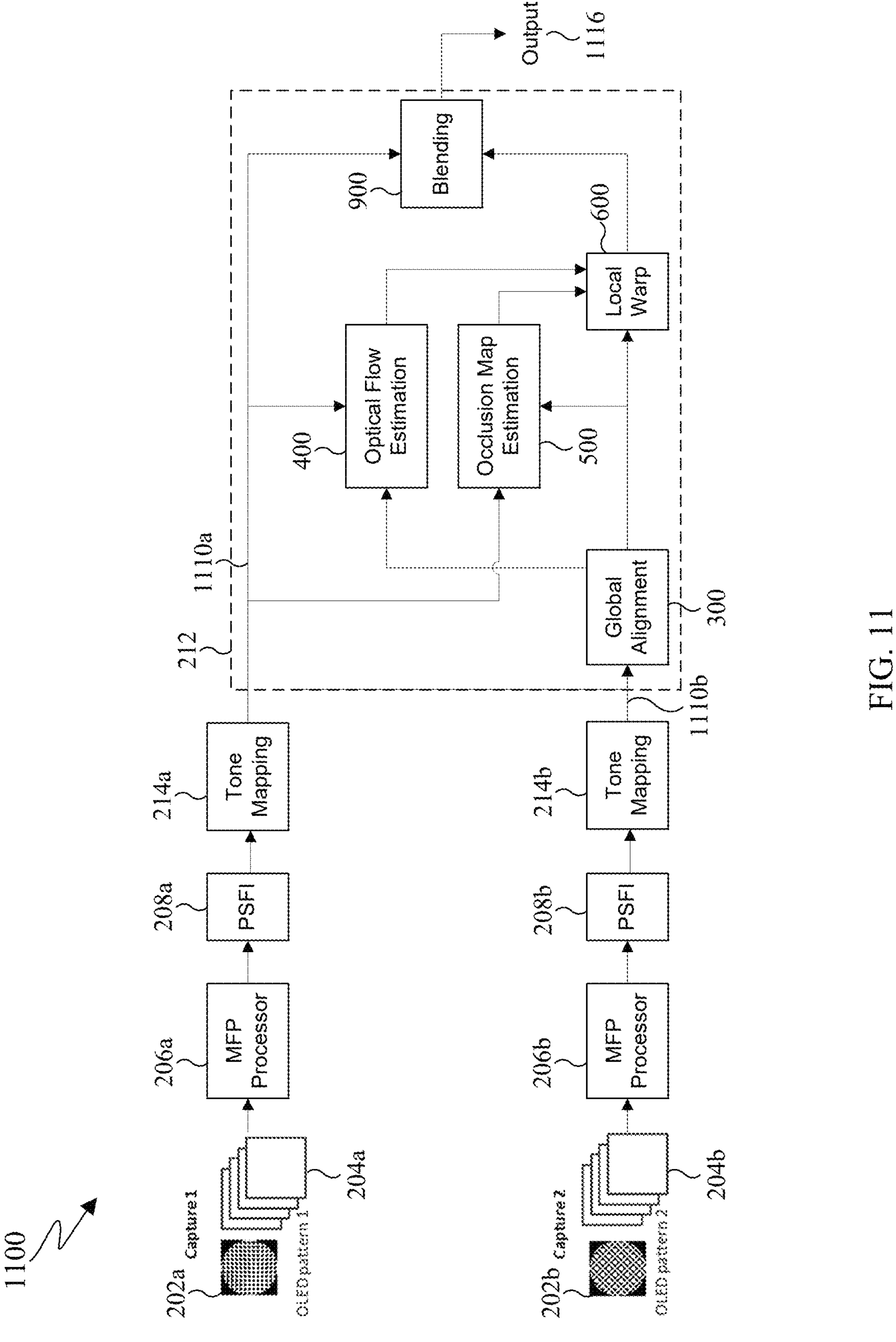
FIGS. 11 through 15 illustrate other example processing pipelines for a UDAC system in accordance with this disclosure.

As shown in FIG. 11, the processing pipeline 1100 can use the tone mapping function 214 on each processing branch prior to the alignment and blending function 212. First and second tone-mapped image frames 1110*a* and 1110*b* can be input into the alignment and blending function 212. In some cases, performing tone mapping before the alignment and blending function 212 may increase a dynamic range of color in a final output image 1116.

Figure 12:
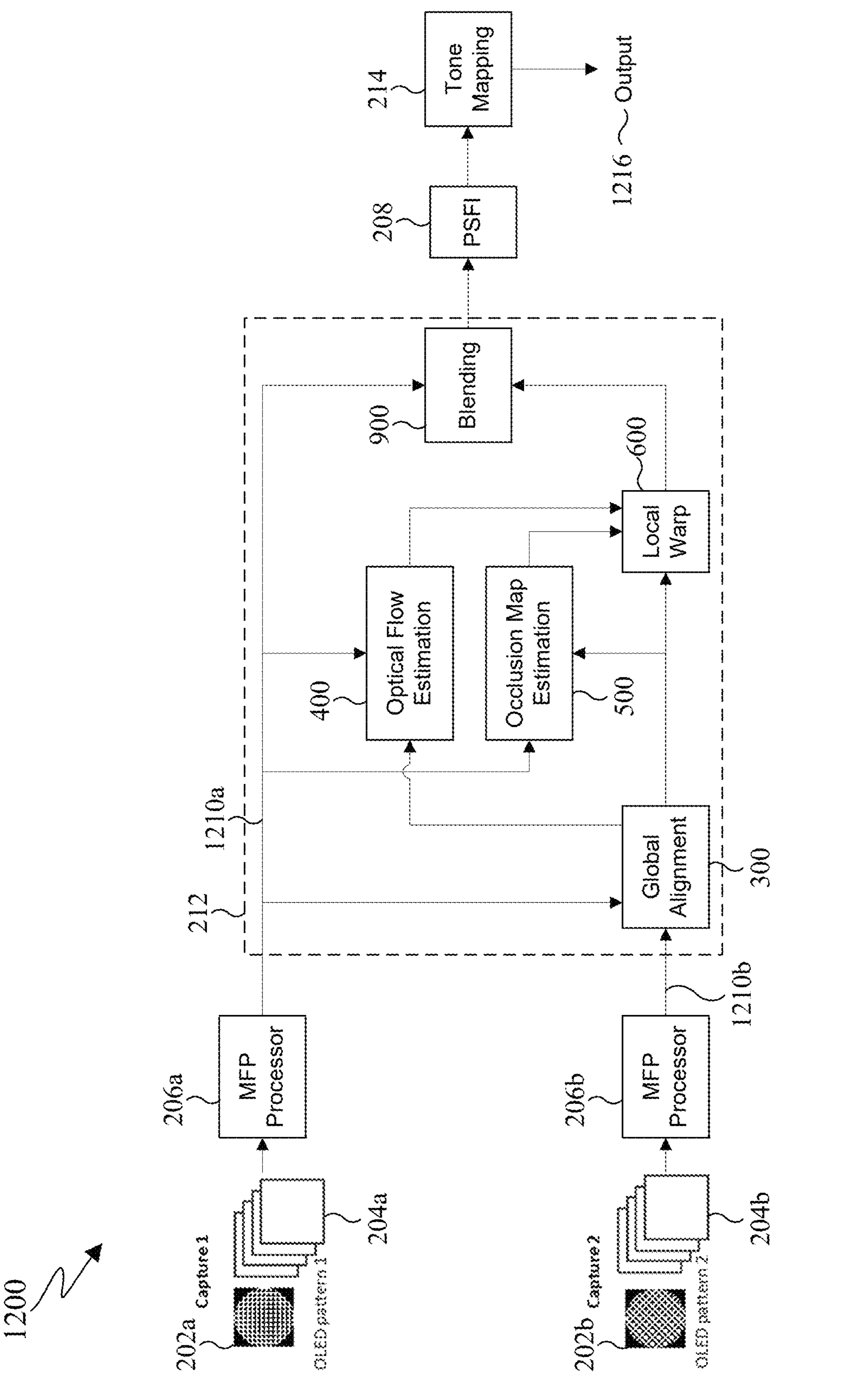

As shown in FIG. 12, a PSFI function 208 may be used after the alignment and blending function 212 in the processing pipeline 1200. Here, first and second MFP-processed image frames 1210*a* and 1210*b* may be input into the alignment and blending function 212. When the PSFI function 208 is used after the alignment and blending function 212, the PSFI function 208 may not be designed to fit the original OLED patterns 202*a* and 202*b*. Instead, the PSFI function 208 can be trained for operating after the alignment and blending function 212, such as by using training data obtained by capturing real UDAC image frames or by generating synthetic UDAC image frames and running the processing pipeline 1200 to obtain synthetic input to the PSFI function 208. In some cases, using the alignment and blending function 212 prior to the PSFI function 208 may reduce computation costs to generate an output image 1216 (compared to generation of the output image 216).

Figure 13:
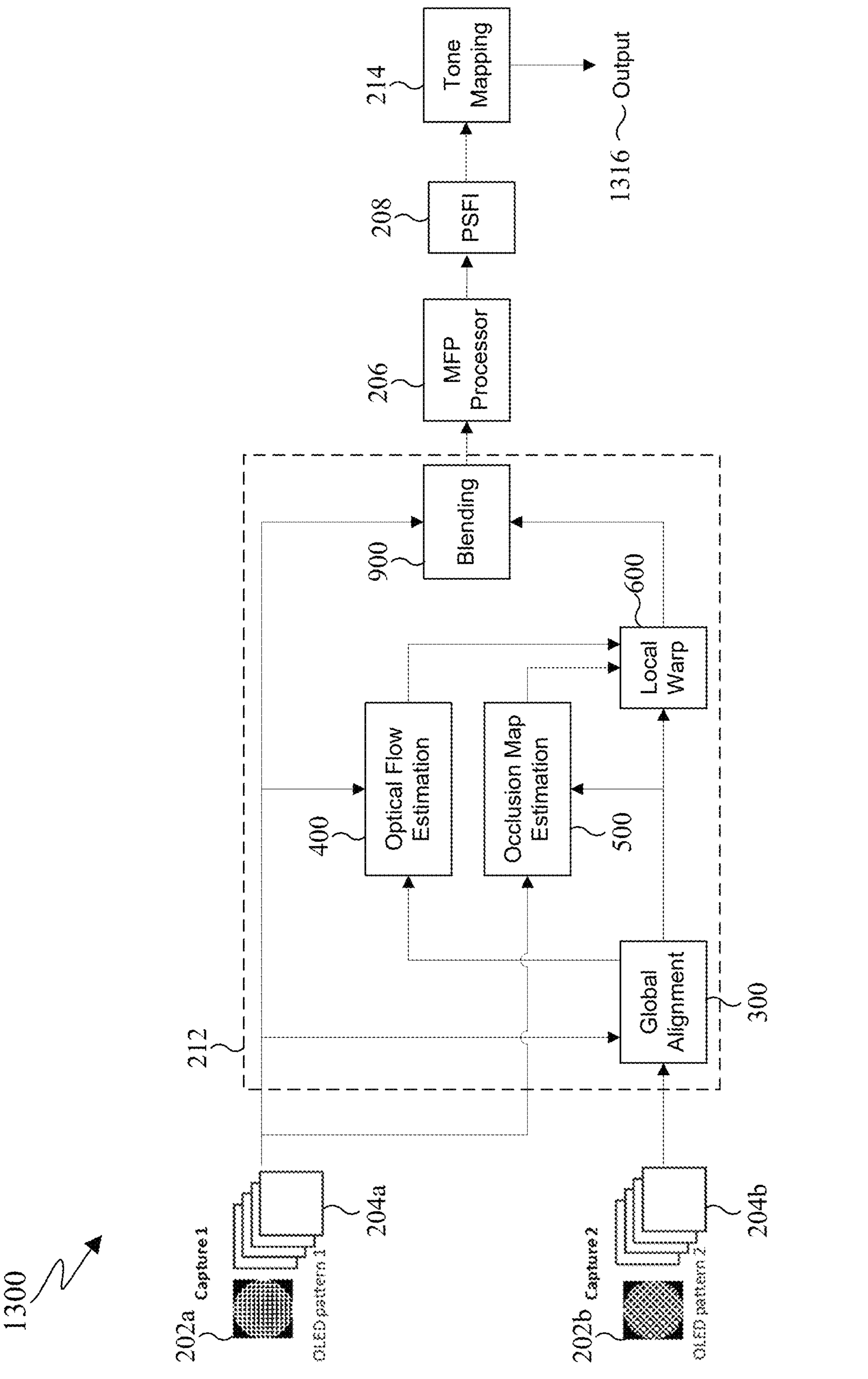

As shown in FIG. 13, the processing pipeline 1300 can use an MFP function 206 after the alignment and blending function 212. Here, the first and second input frames 204*a* and 204*b* can be input into the alignment and blending function 212. Each pair of input frames 204*a* and 204*b* input into the alignment and blending function 212 can produce a blended image frame 902 that are combined in the MFP function 206.

Figure 14:
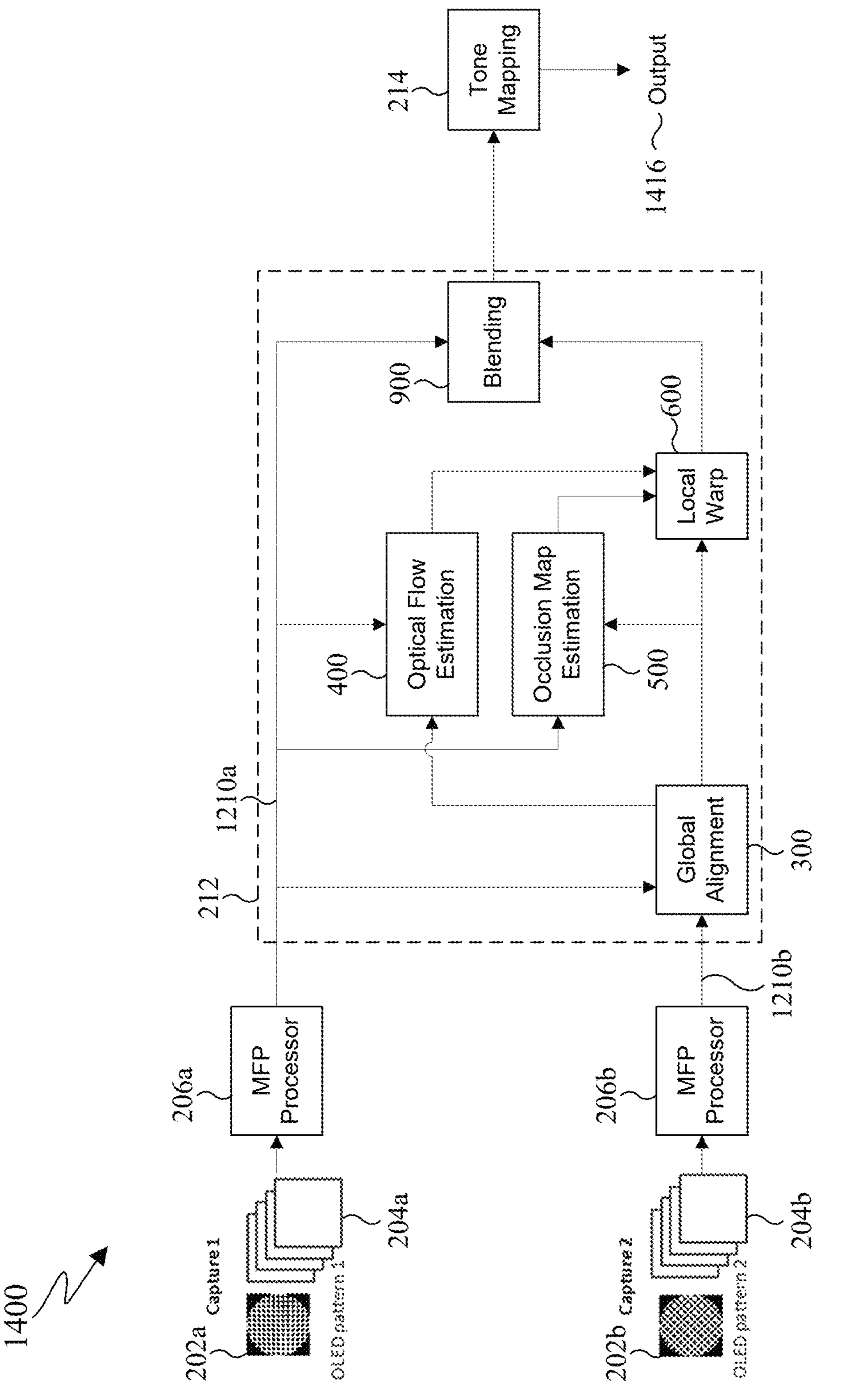

As shown in FIG. 14, the processing pipeline 1400 may exclude a PSFI function 208, such as for image frames that are not UDAC-captured image frames. When applied to non-UDAC image frames, the alignment and blending function 212 can be used before the MFP functions 206*a* and 206*b* or after the tone mapping function 214 to generate an output image 1416.

Figure 15:
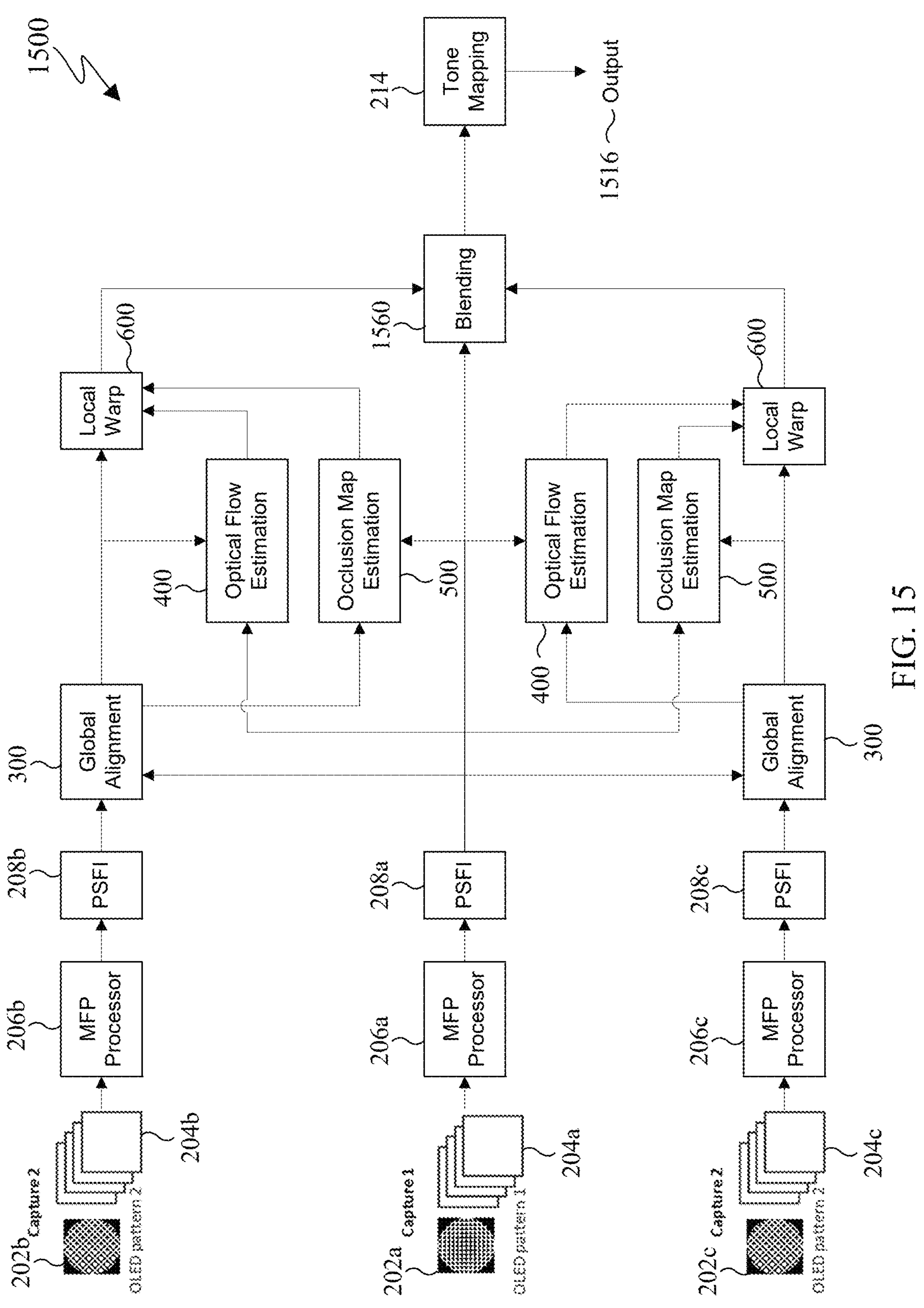

As shown in FIG. 15, the processing pipeline 1500 can produce an output image 1516 using more than two under-display cameras, such as three or more under-display cameras. In this example, the processing pipeline 1500 can be used with OLED patterns 202*a*-202*c* corresponding to input frames 204*a*-204*c*. When there are more than two cameras, each input frame 204*b*-204*c* can be compared to a first input frame 204*a*. Each of the input frames 204*a*-204*c* can be processed through a respective MFP function 206*a*-206*c* and a respective PSFI function 208*a*-208*c*. In some cases, the global alignment function 300, optical flow estimation function 400, occlusion map estimation function 500, and local warp function 600 may process the first and second input frames 204*a* and 204*b* separately from processing the first and third input frames 204*a* and 204*c*. In some cases, these components may be reused to process different pairs of input frames. In other cases, these components may be replicated and used (possibly in parallel) to process different pairs of input frames. The processing pipeline 1500 may utilize a single blending function 1560 that blends the first input frame 204*a* with processed versions of the second and third input frames 204*b* and 204*c*, and the blended image frame can be input to the tone mapping function 214 to generate an output image 1516.

Although FIGS. 11 through 15 illustrate other examples of processing pipelines 1100-1500 for a UDAC system, various changes may be made to FIGS. 11 through 15. For example, various components or functions in these figures may be combined, further subdivided, replicated, rearranged, or omitted according to particular needs. Also, various additional components or functions may be used in these figures. In addition, the numbers of various components (including occlusion maps, flow maps, and input frames) can vary as needed or desired.

Figure 16:
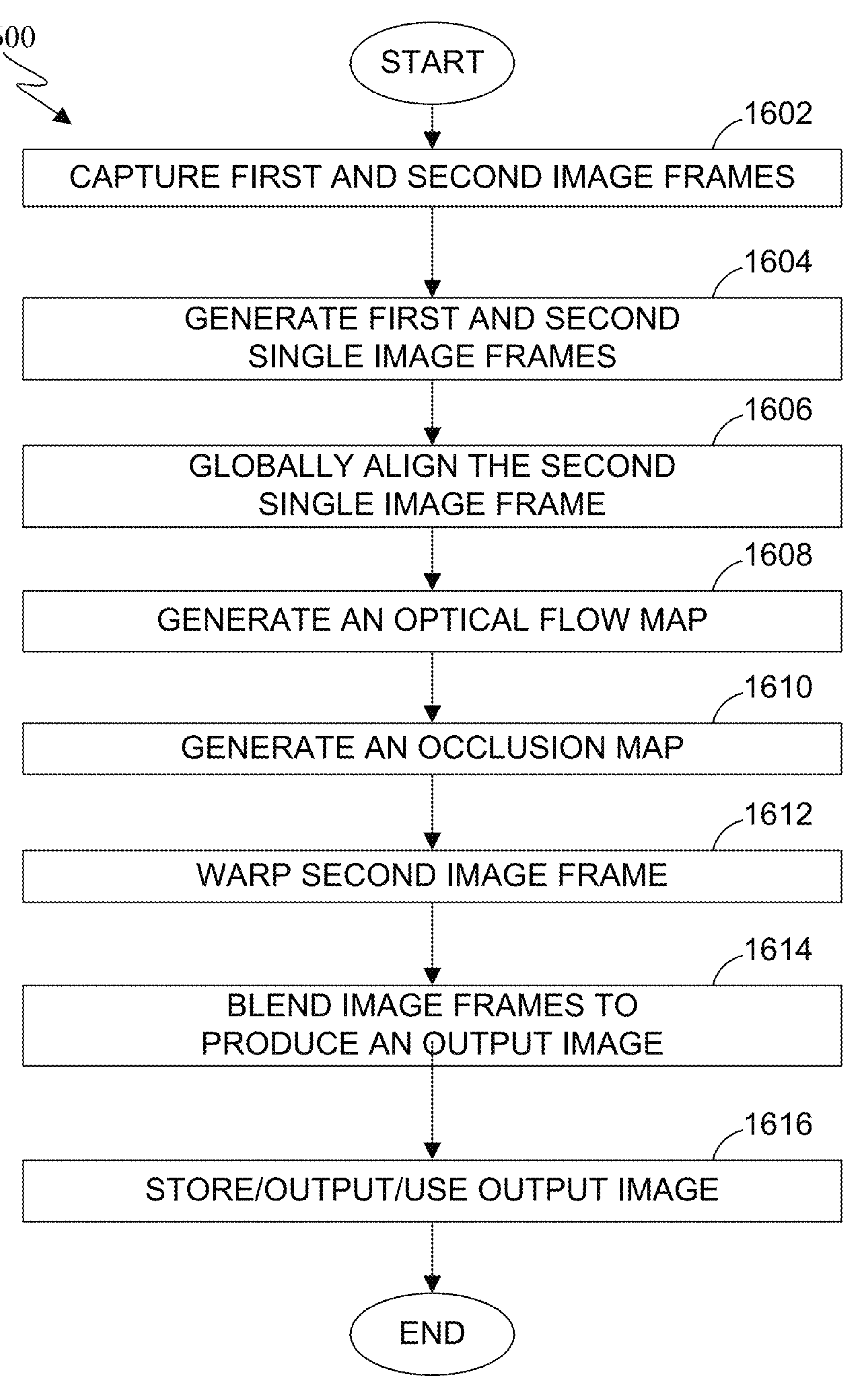
FIG. 16 illustrates an example method for under-display array camera processing for three-dimensional (3D) scenes according to this disclosure.

FIG. 16 illustrates an example method 1600 for under-display array cameras processing for 3D scenes according to this disclosure. For ease of explanation, the method 1600 of FIG. 16 is described as being performed using the processing pipeline 200 of FIG. 2 by the electronic device 101 in the network configuration 100 of FIG. 1. However, the method 1600 may be used with any other suitable device(s) or pipeline(s) and in any other suitable system(s), such as when the method 1600 is used with any of the pipelines 1100-1600.

As shown in FIG. 16, the electronic device 101 can capture first and second image frames at step 1602. For example, a plurality of first image frames and a plurality of second image frames can be captured using first and second under-display cameras positioned under an LED display. A pattern of the LED display above the first under-display camera can be different from a pattern of the LED display above the second under-display camera. The LED display can be an OLED display.

The electronic device 101 can generate first and second single image frames at step 1604. For example, a first single image frame can be generated from the plurality of first image frames, and a second single image frame can be generated from the plurality of second image frames. The electronic device 101 can globally align the second single image frame with the first single image frame at step 1606. For example, a globally-aligned second image frame can be generated by globally aligning the second single image frame to the first single image frame, such as when global homography is performed to align the second single image frame to the first single image frame.

The electronic device 101 can generate an optical flow map at step 1608. For example, the optical flow map can be generated based on the first single image frame and the globally-aligned image frame. The optical flow map can indicate motion information of at least one object in the scene that is captured by the first and second image frames. The electronic device 101 can generate an occlusion map at step 1610. For example, the occlusion map can be generated based on the first single image frame and the globally-aligned second image frame. In some cases, the occlusion map can be a non-binary or soft occlusion map. As a particular example, the non-binary occlusion map may be generated using a sigmoid operator without using a threshold operator. Removing the threshold operator allows continuous values between zero and one for the occlusion map.

The electronic device 101 can warp the second image frame at step 1612. For example, a warped image frame can be generated by warping the globally-aligned second image frame based on the optical flow map and the occlusion map. During the warping, occluded regions in the globally-aligned second image frame apparent in the occlusion map may be substituted with information from the corresponding reference image frame, such as the first single image frame. The electronic device 101 can blend an output image at step 1614. For example, the output image can be generated by blending the first single image frame and the warped image frame. In some cases, the output image can be generated using pyramid blending on the first single image frame and the warped image frame. In other cases, the blending of the first single image frame and the warped image frame can use an average operator, a weighted average operator, or a minimum operator.

The output image is stored, output, or used in some manner at step 1616. For example, the output image may be displayed on the display 160 of the electronic device 101, saved to a camera roll stored in a memory 130 of the electronic device 101, or attached to a text message, email, or other communication to be transmitted from the electronic device 101. Of course, the output image could be used in any other or additional manner.

Although FIG. 16 illustrates one example of a method 1600 for under-display array cameras processing for 3D scenes, various changes may be made to FIG. 16. For example, while shown as a series of steps, various steps in FIG. 16 may overlap, occur in parallel, occur in a different order, or occur any number of times.

It should be noted that the functions described above can be implemented in an electronic device 101, 102, 104, server 106, or other device(s) in any suitable manner. For example, in some embodiments, at least some of the functions can be implemented or supported using one or more software applications or other software instructions that are executed by the processor 120 of the electronic device 101, 102, 104, server 106, or other device(s). In other embodiments, at least some of the functions can be implemented or supported using dedicated hardware components. In general, the functions described above can be performed using any suitable hardware or any suitable combination of hardware and software/firmware instructions. Also, the functions described above can be performed by a single device or by multiple devices.

Although this disclosure has been described with example embodiments, various changes and modifications may be suggested to one skilled in the art. It is intended that this disclosure encompass such changes and modifications as fall within the scope of the appended claims.

What is claimed is:

1. An apparatus comprising:

a light emitting diode (LED) display;

first and second under-display cameras positioned under the LED display, the first under-display camera configured to capture a first image frame, the second under-display camera configured to capture a second image frame; and at least one processor configured to:

globally align the second image frame to the first image frame to generate a globally-aligned second image frame;

generate an optical flow map based on the first image frame and the globally-aligned second image frame;

generate an occlusion map based on the first image frame and the globally-aligned second image frame;

warp the globally-aligned second image frame based on the optical flow map and the occlusion map to generate a warped image frame; and blend the first image frame and the warped image frame to generate an output image.

2. The apparatus of claim 1, wherein, to globally align the second image frame to the first image frame, the at least one processor is configured to perform global homography on the second image frame and the first image frame.

3. The apparatus of claim 1, wherein, to blend the first image frame and the warped image frame, the at least one processor is configured to perform pyramid blending on the first image frame and the warped image frame.

4. The apparatus of claim 1, wherein the occlusion map is a non-binary occlusion map.

5. The apparatus of claim 1, wherein, to blend the first image frame and the warped image frame, the at least one processor is configured to use an average operator.

6. The apparatus of claim 1, wherein, to blend the first image frame and the warped image frame, the at least one processor is configured to use a weighted average operator.

7. The apparatus of claim 1, wherein, to blend the first image frame and the warped image frame, the at least one processor is configured to use a minimum operator.

8. A method comprising:

capturing, using first and second under-display cameras positioned under a light emitting diode (LED) display, a first image frame and a second image frame;

globally aligning the second image frame to the first image frame to generate a globally-aligned second image frame;

generating an optical flow map based on the first image frame and the globally-aligned second image frame;

generating an occlusion map based on the first image frame and the globally-aligned second image frame;

warping the globally-aligned second image frame based on the optical flow map and the occlusion map to generate a warped image frame; and blending the first image frame and the warped image frame to generate an output image.

9. The method of claim 8, wherein globally aligning the second image frame to the first image frame comprises performing global homography on the second image frame and the first image frame.

10. The method of claim 8, wherein blending the first image frame and the warped image frame comprises performing pyramid blending on the first image frame and the warped image frame.

11. The method of claim 8, wherein the occlusion map is a non-binary occlusion map.

12. The method of claim 8, wherein blending the first image frame and the warped image frame comprises using an average operator.

13. The method of claim 8, wherein blending the first image frame and the warped image frame comprises using a weighted average operator.

14. The method of claim 8, wherein blending the first image frame and the warped image frame comprises using a minimum operator.

15. A non-transitory machine readable medium containing instructions that when executed cause at least one processor to:

capture, using first and second under-display cameras positioned under a light emitting diode (LED) display, a first image frame and a second image frame;

globally align the second image frame to the first image frame to generate a globally-aligned second image frame;

generate an optical flow map based on the first image frame and the globally-aligned second image frame;

generate an occlusion map based on the first image frame and the globally-aligned second image frame;

warp the globally-aligned second image frame based on the optical flow map and the occlusion map to generate a warped image frame; and blend the first image frame and the warped image frame to generate an output image.

16. The non-transitory machine readable medium of claim 15, wherein the instructions that when executed cause the at least one processor to globally align the second image frame to the first image frame comprise:

instructions that when executed cause the at least one processor to perform global homography on the second image frame and the first image frame.

17. The non-transitory machine readable medium of claim 15, wherein the instructions that when executed cause the at least one processor to blend the first image frame and the warped image frame comprise:

instructions that when executed cause the at least one processor to perform pyramid blending on the first image frame and the warped image frame.

18. The non-transitory machine readable medium of claim 15, wherein the occlusion map is a non-binary occlusion map.

19. The non-transitory machine readable medium of claim 15, wherein the instructions that when executed cause the at least one processor to blend the first image frame and the warped image frame comprise:

instructions that when executed cause the at least one processor to use an average operator or a weighted average operator.

20. The non-transitory machine readable medium of claim 15, wherein the instructions that when executed cause the at least one processor to blend the first image frame and the warped image frame comprise:

instructions that when executed cause the at least one processor to use a minimum operator.

* * * * *